US012586484B1

(12) United States Patent
Loeb

(10) Patent No.: US 12,586,484 B1
(45) Date of Patent: Mar. 24, 2026

(54) DRIVING SIMULATOR WITH MANUAL AND SEMI-AUTONOMOUS MODES TO ACCLIMATE PEOPLE TO AUTOMATED VEHICULAR FEATURES

(71) Applicant: Jonathan Mimoun Loeb, Wynnewood, PA (US)

(72) Inventor: Jonathan Mimoun Loeb, Wynnewood, PA (US)

(73) Assignee: JITSIK LLC, Wynnewood, PA (US)

( * ) Notice: Subject to any disclaimer, the term of this patent is extended or adjusted under 35 U.S.C. 154(b) by 1549 days.

(21) Appl. No.: 16/183,126

(22) Filed: Nov. 7, 2018

Related U.S. Application Data

(60) Provisional application No. 62/582,630, filed on Nov. 7, 2017.

(51) Int. Cl.
*G09B 9/052* (2006.01)
*G05D 1/00* (2024.01)

(52) U.S. Cl.
CPC ............. *G09B 9/052* (2013.01); *G05D 1/021* (2013.01)

(58) Field of Classification Search
CPC .. G09B 9/00; G09B 9/02–052; G06T 19/006; G06T 19/00; G02B 27/01; G02B 27/017
See application file for complete search history.

(56) References Cited

U.S. PATENT DOCUMENTS 4,962,998 A * 10/1990 Iino ........................ B60K 35/00
359/630

9,202,385 B2 * 12/2015 Pabst ........................ G09B 9/05
2007/0027583 A1 * 2/2007 Tamir ..................... G08G 1/164
701/1

(Continued)

FOREIGN PATENT DOCUMENTS

AU 2012245166 B2 12/2015
DE 102009058491 A1 * 6/2011 ............... G09B 9/05
DE 102009060213 A1 * 6/2011 ........... A63F 13/803

OTHER PUBLICATIONS

Hassan, Bassem et al., "Reconfigurable Driving Simulator for Testing and Training of Advanced Driver Assistance Systems", 2013, IEEE, 337-339 (Year: 2013).*

(Continued)

*Primary Examiner* — Kang Hu
*Assistant Examiner* — Correll T French
(74) *Attorney, Agent, or Firm* — David B. Gornish; Eckert Seamans Cherin & Mellott LLC

(57) ABSTRACT

Systems and methods for providing a real-time, augmented reality (mixed reality) simulation of an experience operating a semi-autonomous (e.g., SAE levels 2 to 5) vehicle are disclosed. In an exemplary embodiment, a user is presented with a simulated environment that allows the user to blend the immediate surroundings with interactive visual data representing various automated features ranging from ADAS (Automated Braking, Lane Keeping . . . ) to operating a fully autonomous vehicle. The first person perspective allows the user to get familiar with these vehicles before operating them in the real world. Additionally the interactions of the user with the semi-automated vehicles and automated features are recorded so they can be analyzed for future improvements.

18 Claims, 8 Drawing Sheets

(56)                References Cited

U.S. PATENT DOCUMENTS

| | | | | |
|---|---|---|---|---|
| 2007/0035561 A1* | 2/2007 | Bachelder | G06T 19/003 | |
| | | | 345/633 | |
| 2009/0011389 A1* | 1/2009 | Sizov | G09B 9/042 | |
| | | | 348/121 | |
| 2012/0065814 A1* | 3/2012 | Seok | B60K 35/00 | |
| | | | 701/2 | |
| 2013/0302760 A1* | 11/2013 | Welles | G09B 9/052 | |
| | | | 434/69 | |
| 2014/0272812 A1* | 9/2014 | Hing | G09B 9/04 | |
| | | | 434/69 | |
| 2015/0211858 A1* | 7/2015 | Jerauld | A61F 9/08 | |
| | | | 701/541 | |
| 2015/0235142 A1* | 8/2015 | Raichelgauz | G06F 16/284 | |
| | | | 706/52 | |
| 2015/0260474 A1* | 9/2015 | Rublowsky | A63F 13/213 | |
| | | | 434/16 | |
| 2015/0310765 A1* | 10/2015 | Wright | G09B 19/167 | |
| | | | 434/66 | |
| 2016/0005333 A1* | 1/2016 | Naouri | G09B 19/167 | |
| | | | 434/66 | |
| 2016/0189560 A1 | 6/2016 | Sizov | | |
| 2016/0321940 A1* | 11/2016 | Banga | G09B 9/05 | |
| 2017/0243504 A1* | 8/2017 | Hada | B60W 30/165 | |
| 2017/0256094 A1* | 9/2017 | Aratsu | H04N 21/812 | |
| 2018/0204478 A1* | 7/2018 | Banga | G09B 9/052 | |
| 2018/0259956 A1* | 9/2018 | Kawamoto | B60W 50/082 | |
| 2019/0009175 A1* | 1/2019 | Buxton | A63F 13/525 | |

OTHER PUBLICATIONS

Ogitsu, Takeki; Mizoguchi, Hiroshi; "A Study on Driver Training on Advanced Driver Assistance Systems by Using a Driving Simulator", 2015, IEEE, 2015 International Conference on Connected Vehicles and Expo, 352-353 (Year: 2015).*

Abraham et al., "Autonomous Vehicles, Trust, and Driving Alternatives: A survey of consumer preferences", MIT Agelab Whitepaper, pp. 1-16 (2016).

* cited by examiner

100

DRIVING SIMULATOR WITH MANUAL AND SEMI-AUTONOMOUS MODES TO ACCLIMATE PEOPLE TO AUTOMATED VEHICULAR FEATURES

FIELD OF INVENTION

The present invention relates to driving simulators with a focus on Advanced Driver Assistance Systems (ADAS), as well as semi-autonomous and fully-autonomous driving modes (e.g., level 2 to 5 as defined by the Society of Automotive Engineers ("SAE") in 2016).

BACKGROUND OF INVENTION

Early development of semi-autonomous vehicles has led to vehicles with level 2 autonomy (as defined by SAE International Standard J3016), in which both the steering and acceleration functions are controlled by an onboard processor. Level 3 to 5 semi-autonomous vehicles are projected to reach the general consumer market in 2020. As the typical lifespan of a consumer vehicle in the US market is 15 years, it is likely that nearly all consumer vehicles will be replaced by autonomous and semi-autonomous vehicles by 2040.

Drivers are slowly adopting this disruptive technology. Consumer Reports released in October 2018 its very first ratings of Automated Driving Systems for four auto manufacturers. Early surveys such as the Future Kelly Blue Book Autonomous Vehicle Driver Study observed that even though autonomous vehicles are expected to enhance safety and driver comfort, the majority of Americans expressed discomfort with the prospect of owning a level 2 to 5 automated vehicle. While some Americans justify this position by the simple claim that they "enjoy driving" or "need to be in control." many Americans do not trust the technology and therefore do not feel comfortable letting go of the steering wheel. In a study of 2954 drivers (Abraham et al., Autonomous Vehicles, Trust and Driving Alternatives: A survey of consumer preferences. MIT Agelab Whitepaper (2016)), researchers reported that in all age categories, more than 60% of drivers would not drive fully autonomous vehicles. For drivers ages 75 and above. 87% of responders indicated that they were not comfortable with fully autonomous vehicles. Given the rising number of automobile-related deaths (40,000 in 2016 according to the National Safety Council), drivers will be encouraged to use vehicles with full autonomy.

Due to these factors and the expected rise in levels 2 to 5 autonomous vehicles, training methods are necessary to improve driver comfort and familiarity to ensure maximum adoption of these technologies. Currently, however, effective driving simulators with Advanced Driver assistance systems have not yet reached the masses. One major reason is the high costs associated with high fidelity driving simulators, which greatly limits deployment. Affordable driving simulators typically rely on a monitor. This, however, results in an inability to provide a realistic driving experience to a user, because the monitor can only provide a limited field of view (e.g., one cannot turn their head left or right to fully view and analyze an intersection). As such, technological and practical impediments to mass deployment of driving simulators involve visual immersion (360° field of view) and mechanical immersion (steering wheel, pedals, dashboard features, etc. need to feel real, and not toy-like). In addition, existing driving simulators, whether in academic or driving school settings, have relied on the idea that the human is in charge. Recent advances present in ADAS have not translated into driving simulators that can mimic a car's ability to take over in an emergency situation (automatic braking, lane keeping assistance, etc.). Often, these issues result in drivers causing serious, and sometimes fatal, accidents due to the drivers' inability to control the vehicles properly.

To date, there is no formal training available for people wishing to adopt ADAS and semi-autonomous vehicle technologies to safely test out these technologies in a risk-free environment. Rather, drivers seeking to adopt these technologies must test-drive a vehicle on an actual road or highway, regardless of whether or not they are comfortable enough to do so. As shown above, most drivers lack this comfort at this time. Therefore, there is a need for relatively low cost, vehicle and mechanically immersing driving simulators to help people gain comfort and confidence with ADAS systems and semi-autonomous vehicles before they can fully adopt them and use them on the road.

BRIEF SUMMARY OF THE INVENTION

In various embodiments of the inventions, systems and methods for learning to operate semi-autonomous (e.g., level 2 to 5 as defined by SAE) vehicles are disclosed (while autonomous and semi-autonomous vehicles vary considerably, although all such vehicles are within the scope of the systems and methods described herein, for the sake or conciseness and clarity, all such vehicles will be referred to herein as level 2 to 5 semi-autonomous vehicles). Systems and methods disclosed therein may include producing simulations during which a user operates a level 2 to 5 semi-autonomous vehicle in an immersive environment. Simulations may include various factors helpful for providing drivers with experience with such vehicles. For instance, because level 2 to 5 semi-autonomous vehicles vary considerably, simulations may be based on the specific performance of a particular vehicle, including the various capabilities of the vehicle.

In various embodiments, several real-world scenarios may be created via augmented reality simulations in order to acclimate a driver to a wide variety of situations. For instance, simulations may include malfunctioning vehicles so that a user may learn how to respond in the event of such a malfunction, while being in a safe environment from which the simulation may be operated, rather than the potentially fatal consequences that may occur with a truly malfunctioning vehicle in the real world. Additional real world situations may include, but not be limited to pot holes, slippery roads and other road conditions, poor drivers, weather conditions, etc.

In various embodiments, a feedback system may be provided to indicate to a user his or her aptitude for operating a level 2 to 5 semi-autonomous vehicle. For instance, a user's performance during a simulation may be graded, or ranked against other users in order to determine the user's absolute or relative aptitude.

In various embodiments, a simulation may begin by receiving a user input to begin the simulation. The user may be wearing a headset capable of projecting images in an augmented reality manner. As such, while a user may be in a safe environment (e.g., a parked car, an office with an artificial steering wheel, throttle pedal and brake pedal, etc.), the headset may display interactive visual data that provides the user with the appearance that the user is actually operating a vehicle in a real world setting (e.g., a highway). In various embodiments, rather than an augmented reality headset, the interactive visual data may be displayed using a holographic display, a green screen, a virtual reality headset, or any other visual medium capable of providing an immersive experience that simulates the operation of a vehicle.

DETAILED DESCRIPTION

The present disclosure, as set forth below, is generally directed to various embodiments of systems and methods related to providing a simulation of an operation of a semi-autonomous vehicle.

Figure 1:
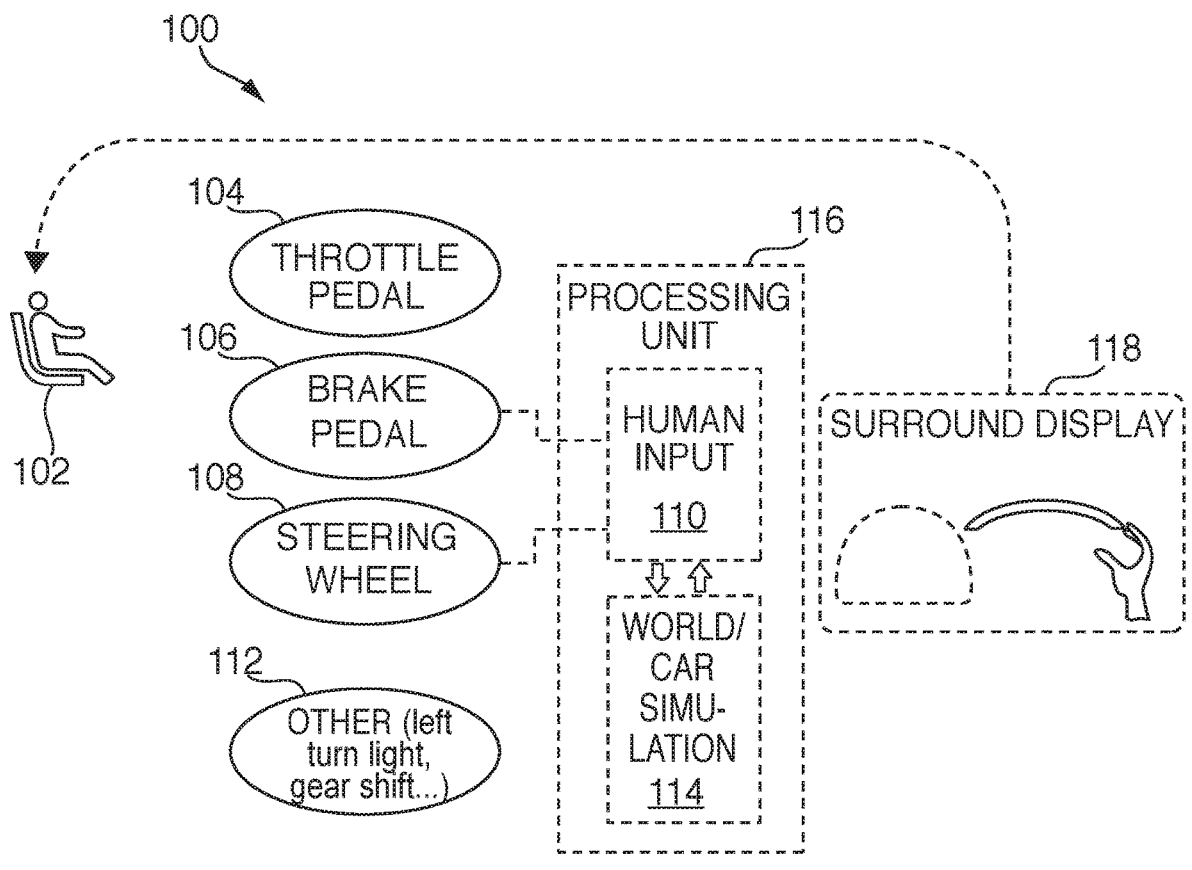
FIG. 1 is a schematic illustration of a system for a simulation, in accordance with various embodiments.

FIG. 1 is a schematic illustration of a system for a simulation, in accordance with various embodiments. In various embodiments, system 100 includes user 102, devices 104, 106, 108, human input module 110, miscellaneous actuator/sensor 112 (e.g., an On-Board Diagnostic ("OBD2") port), world/car simulation module 114, and processing unit ("PU") 116, and display 118.

As stated above, in some embodiments, a vehicle control input device may be an OBD2 port. Many vehicles include an OBD2 port for indicating to an operator various metrics relating to a condition of the vehicle. As such, in the event that an augmented reality simulation is being operated using a real vehicle (as opposed to a chair simulator, as described in further detail below) may include a headset or device (as described in further detail below) may include circuitry and other capabilities to couple to the vehicle via OBD2 port. Such coupling would allow system 100 to retrieve data corresponding to various inputs received by the vehicle, such as when a user engages a pedal, turn signal, windshield wiper, steering wheel, etc., and store that data for future development of the systems and methods described herein, or for assessment of the user's operation of a vehicle during a simulation.

User 102 may be an operator of the vehicle who intends to familiarize himself or herself with a semi-autonomous vehicle. Accordingly, user 102 may be seated in the driver's seat of such a vehicle. In various embodiments, however, rather than an actual vehicle, the "vehicle" may be a chair simulator that is equipped with devices for receiving human inputs that are comparable to the operation of a vehicle. The vehicle may include various vehicle control input devices coupled to (or integrated with) one or more vehicle controls, such as a throttle pedal (device 104), a brake pedal (device 106), a steering wheel (device 108), or some other miscellaneous control (device 112), each of which are operable to receive human inputs. For instance, in various embodiments, the term "vehicle control" may refer to a real or artificial actuator for operating a vehicle. For instance, in various embodiments, a simulation may be carried out using an actual vehicle. As such, a vehicle control may be a car steering wheel, a throttle pedal, a brake pedal, and various other components of an actual vehicle.

In various alternative embodiments, a simulation may not be carried out in an actual vehicle. For instance, a simulation may be carried out in a chair simulator. A chair simulator may be any means for providing artificial vehicle components to a user in a manner in which a simulated driving experience may be provided. For instance, a chair simulator may include a steering wheel placed onto a desk, with various actuators, sensors, and other components necessary to receive human inputs and provide feedback to a user. A chair simulator may also include pedals placed near a user's feet such that the user may operate them in a similar manner that a user would operate actual pedals in an automobile. The pedals may also include actuators, sensors, and other components necessary to receive human inputs and provide feedback to a user. In various other embodiments, a chair simulator may be a booth, room, or other environment with the components necessary to emulate a vehicle, such that a user is provided with an immersive experience that is substantially identical to an actual vehicle. In various other embodiments, devices 104, 106, 108, and 112 may take the form of other devices entirely, including, but not limited to, mobile joysticks, levers, buttons, rotating wheels, touchscreens, video game controllers, keyboards, and any other input device that may be used to operate a vehicle. Such devices may be oriented in a manner that emulates a particular vehicle to which a user is attempting to become acclimated.

Each vehicle control input device may be operable to receive human inputs 110 by detecting and measuring movement, pressure, or any change in state occurring at a vehicle control. For example, device 108 may detect human inputs in the form of counterclockwise or clockwise rotational movement of a steering wheel, left and right movement of a joystick, varying degrees of pressure being placed on a multidirectional pad, etc. Device 108, as will be shown in FIG. 2, may include communications circuitry for providing data representing the detected human inputs to a processor located on the headset, some external computer that controls the overall simulation, or some other processing unit 116.

These human inputs 110 may then be interpreted at processing unit 116. For instance, at processing unit 116, an input 110 of a counterclockwise movement detected at device 108 may indicate that user 102 is attempting to turn the vehicle toward a frontward direction to the left of the vehicle (or, if the vehicle is operating in reverse at this point during the simulation, may be toward a rearward direction to the right of the vehicle). Accordingly, processing unit may output information through simulation 114 such that the surround display 118 shows that the vehicle in which the user 102 is operating simulation 114 is moving in the intended direction, in accordance with the inputs received at device 108. In another exemplary embodiment, if the input 110 received is an increase in downward pressure detected at device 104, then the output may be an acceleration of the vehicle as depicted in the simulation.

Display 118 may be any means for displaying simulation 114. For instance, in one exemplary embodiment, display 118 may include a headset and a windshield of the vehicle. The headset may include a transparent display through which user 102 may observe the vehicle, including the dashboard, steering wheel, and windshield of the vehicle. In some embodiments, from the perspective of user 102, the perceived environment outside of the windshield may be a substantially different environment from reality. For instance, as will be shown in greater detail, through display 118, user 102 may look outward from the vehicle and receive the perception that he or she is driving on a highway, when in reality, user 102 is sitting in an automobile located in a parking lot.

Figure 2:
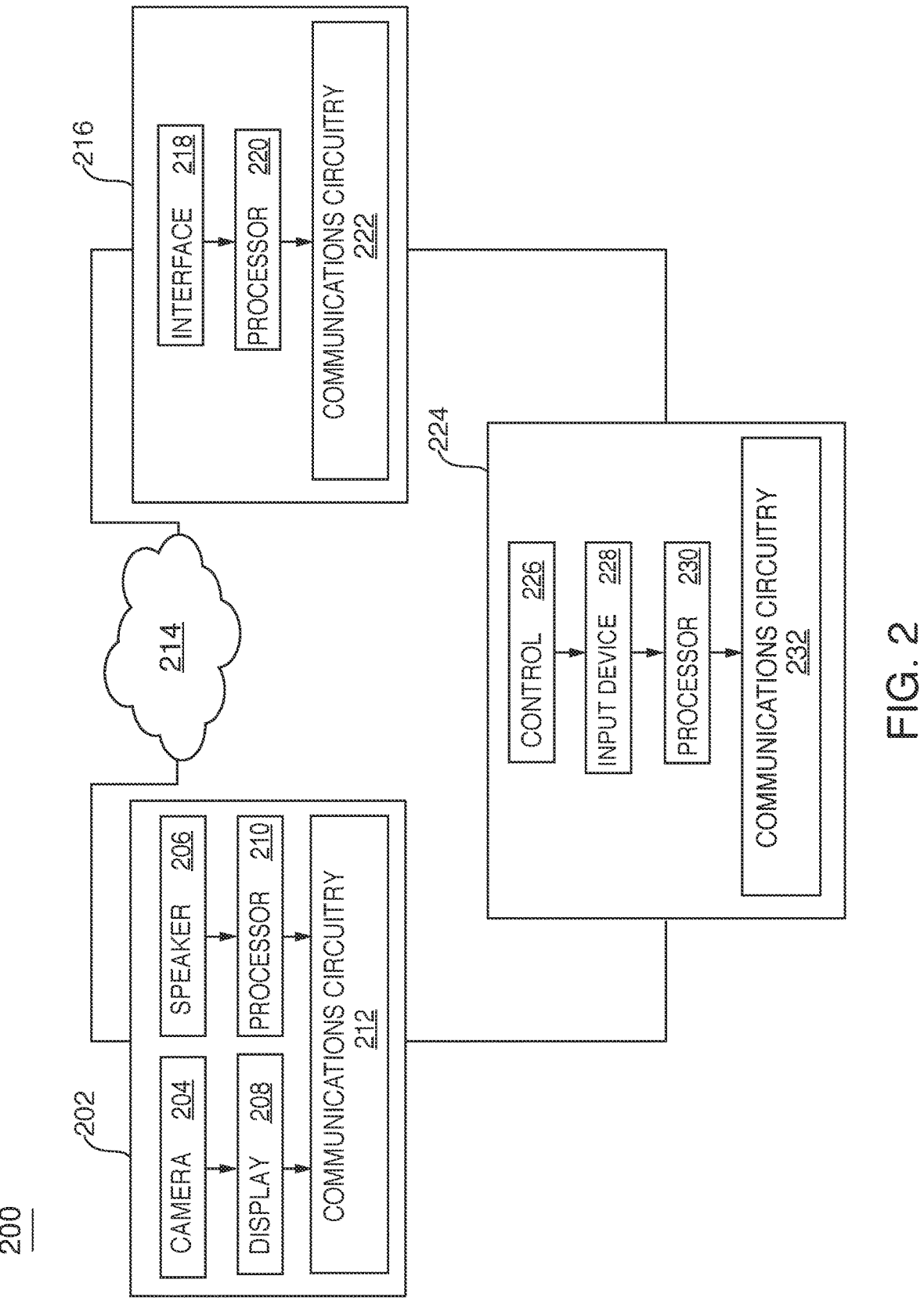
FIG. 2 is a schematic illustration of a system, in accordance with various embodiments.

FIG. 2 is a schematic illustration of a system, in accordance with various embodiments. System 200 may include a headset 202 (which may include camera 204, speaker 206, display 208, processor 210, and communications circuitry 212), server 214, device 216 (which may include display 218, processor 220, and communications circuitry 222), and vehicle 224 (which may include control 226 for operating the vehicle, vehicle control input device 228, processor 230, and communications circuitry 232).

Headset 202 may include camera 204. Camera 204 may be any camera known in the art that is capable of recording visual data. As such, camera 204 may capture images as well as video data. In some embodiments, camera 204 may be used to capture video data corresponding to the interior or exterior of a vehicle. This data may then be transmitted to processor 210 to determine a make and model of the vehicle, which will then be used to generate a simulation. In some embodiments, headset 202 may include multiple cameras 204. Furthermore, camera(s) 204 may be configured to recognize far-field imagery (e.g., objects located at a large distance away from headset 202) or near-field imagery (e.g., objected located at a relatively small distance from headset 202). Camera(s) 204 may include one or more infrared cameras capable of detecting the depth and shape of objects (such as windshield shape and location). In some embodiments, camera(s) 204 may be high-definition ("HD") cameras, capable of obtaining images and/or videos at a substantially large resolution (e.g., 726p, 1080p, 1080i, etc.). In some embodiments, camera(s) 204 may be optional for headset 202. For instance, camera(s) 204 may be external to, and in communication with, headset 202. For example, an external camera (e.g., a camera housed within, or otherwise in communication with, device 216) may be capable of capturing images and/or video, which may then be provided to headset 202 for viewing and/or processing.

Headset 202 may also include speaker 206 and display 208. Through speaker 206 and display 208, audio and video data from the simulation may be presented to the user, providing the user with an augmented reality immersive experience that emulates real world conditions under which the user might operate a semi-autonomous vehicle. Speaker(s) 206 may correspond to any suitable mechanism for outputting audio signals. For example, speaker(s) 206 may include one or more speaker units, speaker housings, transducers, arrays of speakers, and/or arrays of transducers that may be capable of broadcasting audio signals and or audio content to a surrounding area where headset 202 may be located. In some embodiments, speaker(s) 206 may include headphones or ear buds, which may be wirelessly connected or hard-wired to headset 202, that may be capable of broadcasting audio directly to an individual. Headset 202 may also include a microphone for receiving inputs in the form of audio signals. Those audio signals may be transmitted to processor 210 to convert into audio data that may be interpreted to determine whether these inputs include voice commands that may be carried out by system 200. Persons of ordinary skill in the art will appreciate that headset 202, through the use of a microphone, may receive audio signals and use various tools known in the art, including, but not limited to, speech-to-text, automatic speech recognition, and natural language understanding, for the purpose of receiving audio inputs for performing various functions.

Display 208 may be a display screen. In some embodiments, headset 202 may be an augmented reality headset. Accordingly, in such embodiments, display 208 may be a transparent screen. Display 208 may be formed of any polymer and/or monomer known in the art for producing displays, such as glass, LCD, LED, etc. Various types of displays may include, but not be limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Display 208 may include circuitry for presenting visual data to a user as the user looks at the environment through display 208. For instance, as explained above in an exemplary embodiment, a user may be sitting inside a vehicle, while looking out of the windshield of a vehicle. Display 208 may display the interior of the vehicle, such as the steering wheel, the throttle pedal, the brake pedal, the dashboard, the center console and the windshield. Each of these vehicle controls may look as though the user were not looking through any augmented reality display screen at all. However, as the user looks through the windshield of the vehicle, the user may see an entirely different environment from reality. For instance, while the user may be sitting in a parked automobile in a garage or parking lot, display 208 may be showing that, through the windshield of the vehicle, the user is actually driving on an interstate highway. In some embodiments, speaker 206 may also be functioning to output moving cars, honking horns, rain, or any other environmental sounds common to a real world driving experience.

In some embodiments, elements of the dashboard may also be different from reality when viewed by the user through display 208. For instance, a speed at which the car is "moving" in the simulation may be displayed on the speedometer as going sixty miles per hour when viewed through display 208, even though the vehicle is actually parked. In some embodiments, the display of a simulated outside environment may not be limited to a windshield, but may additionally be provided through side windows, a rear view mirror, a display screen located in a dashboard or center console, a portable display device (e.g., a laptop computer, tablet computer, etc.) or any other features and/or controls through which a user may perceive the external environment of a vehicle that he or she is operating from within.

Processor(s) 212 may include any suitable processing circuitry capable of controlling operations and functionality of headset 202, as well as facilitating communications between various components within headset 202. In some embodiments, processor(s) 210 may include a central processing unit ("CPU"), a graphic processing unit ("GPU"), one or more microprocessors, a digital signal processor, or any other type of processor, or any combination thereof. In some embodiments, the functionality of processor(s) 210 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 210 may include its own local memory, which may store program systems, program data, and/or one or more operating systems. However, processor(s) 210 may run an operating system ("OS") for headset 202, and/or one or more firmware applications, media applications, and/or applications resident thereon. In some embodiments, processor(s) 210 may run a local client script for reading and rendering content received from one or more websites. For example, processor(s) 210 may run a local JavaScript client for rendering HTML or XHTML content received from a particular URL accessed by headset 202.

Communications circuitry 212 may be used to communicate with vehicle 224, device 226 (which may be used to start, end, and/or control the simulation), a server, or any other component of system 200. Communications circuitry 212 may include any circuitry allowing or enabling one or more components of headset 202 to communicate with one another, and/or with one or more additional devices, servers, and/or systems. For example, communications circuitry 212 may facilitate communications between device 216 and vehicle 224. As an illustrative example, an input representing a command to begin a simulation may be received and transmitted over a network, such as the Internet, from device 216 to headset 202 using any number of communications protocols. For example, network(s) may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and wireless application protocol ("WAP"). In some embodiments, headset 202, server 214, device 216, and vehicle 224 may communicate with one another via a web browser using HTTP. Various additional communication protocols may be used to facilitate communications headset 202, server 214, device 216, and vehicle 224, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/ TDMA, iDen, LTE or any other suitable cellular network protocol), infrared, BitTorrent, FTP, RTP, RTSP, SSH, and/ or VOIP.

Communications circuitry 202 may use any communications protocol, such as any of the previously mentioned exemplary communications protocols. In some embodiments, headset 202 may include one or more antennas to facilitate wireless communications with a network using various wireless technologies (e.g., Wi-Fi, Bluetooth, radiofrequency, etc.). In yet another embodiment, headset 202 may include one or more universal serial bus ("USB") ports, one or more Ethernet or broadband ports, and/or any other type of hardwire access port so that communications circuitry 212 allows headset 202 to communicate with one or more communications networks.

Server 214 may be any external server that communicates wirelessly. Accordingly, server may include communications circuitry similar to communications circuitry 202. Server 214 may also include storage/memory (which will be described in greater detail below with respect to headset 202) for storing various information. For instance, server 214 may include a database of simulations. The database may include a catalogue of simulations that may be categorized according to vehicle make and model. In an exemplary embodiment, upon receiving an input representing a command to begin a simulation, headset 202 may capture one or more images and/or videos of vehicle 224 and send that data to server 214. Server 214 may then determine a make and model for vehicle 224 and select an appropriate simulation. In an alternative embodiment, server 214 may instead transmit data representing a list of simulations appropriate for the make and model of vehicle 224 to headset 202 so that user may, through a user interface located on headset (e.g., buttons, touch screen, voice commands received by a microphone), select a simulation.

Alternatively, headset 202 may include internal storage/ memory for determining a make and model for vehicle 224. Headset 202 may then provide data including the make and model of vehicle 224 and server 214 may determine an appropriate simulation. In an alternative embodiment, server 214 may instead transmit data representing a list of simulations appropriate for the make and model of vehicle 224 to headset 202 so that user may, through a user interface located on headset (e.g., buttons, touch screen, voice commands received by a microphone), select a simulation. In yet another alternative embodiment, server 214 may not exist in system 214 at all, and headset 202 may include internal memory and processing power capable of receiving images and/or videos captured by camera 204, determine a make and model stored in memory, and either automatically select a simulation, or allow a user an opportunity to select a simulation.

The determination of a make and model of vehicle 224 may be performed by capturing images and/or videos and comparing the captured images and/or videos to images and/or videos stored in memory. For instance, features unique to a particular make and model of a vehicle may be captured by camera 204 and, when compared to a repository of visual data stored in memory (e.g., memory in headset 202 or server 214), may allow processor 210 (or a processor located at server 214) to determine a make and model for vehicle 224. In some embodiments, a user may simply provide the make and model of vehicle 224 through a user interface at headset 202 or device 216.

Storage/memory may include one or more types of storage mediums such as any volatile or non-volatile memory, or any removable or non-removable memory implemented in any suitable manner to store data. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory may be implemented as computer-readable storage media ("CRSM"), which may be any available physical media accessible by processor(s) 210 to execute one or more instructions stored within storage/memory. In some embodiments, one or more applications (e.g., gaming, music, video, calendars, lists, etc.) may be run by processor(s) 210, and may be stored in memory.

In some embodiments, storage/memory may include a media system, which may be configured to facilitate communications between headset 202 and other devices. For example, the media system may store one or more communications protocols that may be executed by processor(s) 210 for facilitating communications for headset 202. In some embodiments, a sessions initiation protocol ("SIP") may be used to facilitate media transfer between headset 202 and one or more other electronic devices (e.g., server 214, device 216, and/or vehicle 224). SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for headset 202. In some embodiments, a Web Real-Time Communications ("WebRTC") protocols may be employed by headset 202. In a non-limiting embodiment, the media system may include instructions that indicate which communications protocols to employ for facilitating media transfer between devices based on a device type.

In some embodiments, device 216 may be used to communicate with headset 202. For instance, device 216 may include interface 216 for receiving an input representing a command to begin a simulation. Device 216 may include a processor 220 for interpreting the commands. Device 216 may also include communications circuitry 222 similar to communications circuitry 212. In some embodiments, device 216 may utilize communications circuitry to relay the command to begin a simulation to headset 202. Headset 202 may then capture visual data representing vehicle 224 to determine a make and model of vehicle 224. In some embodiments, headset 202 may then determine the make and model of vehicle 224. In an alternative embodiment, headset 202 may transmit the visual data to device 216, which may determine the make and model via internal memory that stores of visual data corresponding to known vehicle makes and models (similar to the process performed by server 214), or may transmit data to server 214 to determine the make and model of vehicle 224. Server 214 or device 216 may then automatically determine an appropriate simulation. In another alternative embodiment, however, device 216, through interface 218, may allow a user to select a simulation. Simulations may be stored in memory located at headset 202, server 214, device 216, and/or vehicle 224.

Vehicle 224 may be configured to interact with any other component of system 200. Vehicle 224 may also be capable of providing feedback to a user when the user attempts to operate the vehicle via controls 226. In an illustrative embodiment, during a simulation, a user may attempt to steer the vehicle by rotating it accordingly. The rotational movement may be detected by vehicle control input device 228 and interpreted by processor 230 as a user input. This input may be sent to headset 202 (or, alternatively, server 214 or device 216). According to the simulation, it may be known that the vehicle includes steering assistance, by which vehicle 224 provides resistance to the movement of the steering wheel such that vehicle 224 does not immediately steer in a particular direction as sharply as the user would like, possibly due to vehicle 224 detecting that such a movement would be dangerous in light of the curvature of the road and the speed of the vehicle, the vehicle detecting an adjacent vehicle with which vehicle 224 would collide as a result of the user input, or any other reason for such feedback.

In another alternative embodiment, vehicle 224 may, according to movements made by the vehicle in the simulation, might move the vehicle control 226 in accordance with such movements. For instance, if the simulation shows the vehicle moving to the right in order to follow along with the curvature of a road, vehicle 224 may automatically move the steering wheel in a clockwise direction, even though a user is not operating the steering wheel.

Vehicle control input device 228, in some embodiments, be an inertial measurement unit. For instance, device 228 may be a gyroscope, a pressure sensor, or any device capable of detecting a change in state of a vehicle control. In some embodiments, device 228 is coupled to vehicle control 226. In other embodiments, device 228 is integrated with vehicle control 226 such that device 228 is an internal or external component of vehicle control 228. Thus, in some embodiments, device 228 and vehicle control 226 may be referred collectively as a single unit, and may be in fact a single unitary device.

Figure 3:
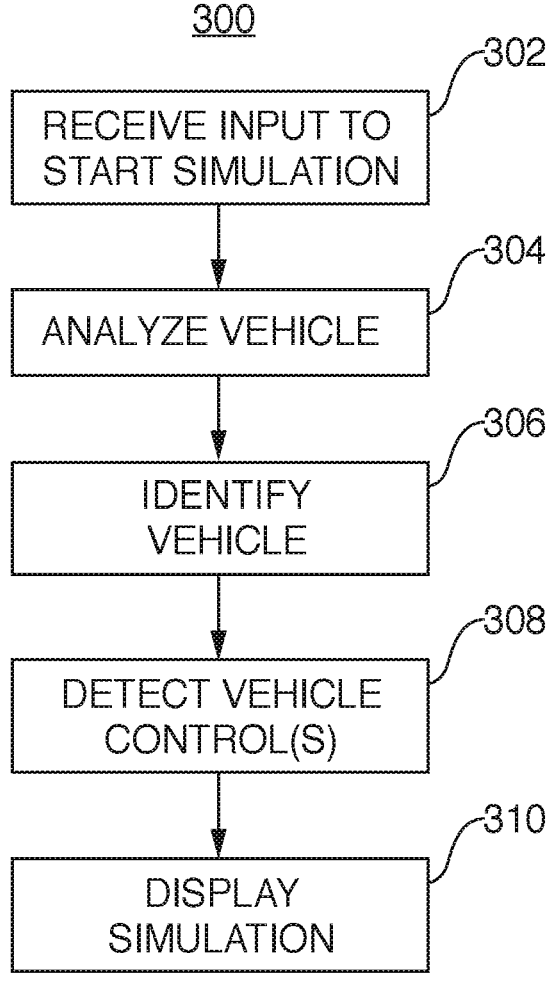
FIG. 3 is an illustrative diagram of a process for simulating an experience in a semi-autonomous (SAE levels 2 to 5) vehicle, in accordance with various embodiments.

FIG. 3 is an illustrative diagram of a process for simulating an experience in a semi-autonomous (SAE levels 2 to 5) vehicle, in accordance with various embodiments. At step 302, an input is received to begin a simulation. The input may be received from a headset, a user device (e.g., device 216 in FIG. 2), or any other device capable of receiving inputs from a user and transmitting that information to another device.

At step 304, a vehicle is analyzed. This may be performed by a camera (e.g., a camera located at a headset) capturing images of the vehicle. Images from the camera may then be transmitted to a processor to analyze the vehicle using the captured image. In an alternative embodiment, the captured image(s) may include an image of a gesture made by the user. For instance, a user may be wearing a headset that presents an augmented reality. The headset may display to the user a visual interface for selecting various operations related to the simulation. Using the camera, the headset may receive images of gestures made by the user that represent various commands that a system can carry out. For instance, a headset may display a "button" that a user may "press" through a pointing gesture at a specific spatial location, which may cause the vehicle to be identified. These images may then be interpreted at a processor to determine the specific command and how to carry out the command. At step 306, the vehicle may be identified using the image. For instance, a make and model of the vehicle may be determined based on emblems, structures, layouts, and other features of the vehicle that may be relatively idiosyncratic or unique to the vehicle and/or its make and model. In the event that a user is operating a chair simulator, rather than an actual vehicle, the orientation of items in such an artificial vehicle may identify the vehicle to be identified for use in the simulation. At step 308, a vehicle control input device is detected. This may be performed by a camera capturing images to determine relevant features of the vehicle. For example, a vehicle make and model may have the same general features throughout different vehicles, while some vehicles may differ within the same class of make and model. As such, certain features of a particular vehicle may not be able to be ascertained solely based off knowledge of the make and model of the vehicle. Accordingly, images and/or video captured by the camera may be used to determine specific features that may be available in the particular car. In an alternative embodiment, however, such information may simply be ascertainable solely based off knowledge of the make and model, and therefore, a processor may not need images of the vehicle itself to determine which features are present. Then, based on the known images, a particular vehicle control input device may be detected. For instance, a vehicle control input device may be a button for turning on/off certain automated functions, a toggle for analogically adjusting a level of the vehicle's autonomy, information in a speedometer, a steering wheel, a brake pedal, a throttle pedal, or any other control used for operating the vehicle. The vehicle control input device may also be identified using communications circuitry located throughout the system (e.g., within the headset, a user device, a server, etc.) to detect the presence of other devices that may be utilized within the system for carrying out process 300 and similar processes or variants thereof.

At step 310, the simulation is displayed. The simulation may be displayed on a display screen located outside the vehicle (e.g., green screen), or the simulation may be displayed on a display screen of a virtual reality headset. In another embodiment, however, the simulation may be displayed through the use of an augmented reality headset. For instance, the simulation may be displayed through a display of the headset (e.g., lens 509) such that it appears that the simulation is being projected throughout the entire environment, including the interior and external environment within and without the vehicle. In some embodiments, sensors may be coupled to a windshield, side windows, a rear view mirror and/or side mirrors, and other surfaces such that interactive visual data is specifically presented at those surfaces. For instance, a sensor may be detected using a camera, and may be used to calibrate a headset with a vehicle. Accordingly, the sensors may create an virtual display screen upon which the interactive visual data will be "projected" in order to ensure that objects located within the external environment are not visible to the user, and objects not located within the external environment are visible to the user as virtual objects, such that objects located within the external environment do not interfere with the user's ability to view those external objects.

In some embodiments, a simulation may be operated by one or more persons monitoring and manipulating the interactive visual data in real time. For instance, an administrator may include various elements to a simulation, such as obstructions (e.g., random pedestrians running into the path of the vehicle, rain, potholes, etc.), vehicular malfunctions (flat tires, sudden failure of an automated feature, broken lights, etc.), and other random variables that a user must account for in a real-world driving scenario.

In some embodiments, a simulation may be recorded and analyzed for the purpose of providing further improvements. For instance, gestures, viewpoints recorded by a camera, and/or actions taken by a user in response to various elements (road conditions, sudden obstructions, vehicular malfunctions, etc.), among other occurrences that may take place during a simulation, may be recorded and stored in memory. These occurrences may then be reviewed and used to create an assessment of the user's operation of the vehicle during the simulation. Accordingly, users may receive feedback regarding their aptitude for operating a vehicle, which may be used to determine whether they are ready to operate a vehicle in the real world. Additionally, simulations may be recorded and stored in memory for later use in improving the quality of simulations.

In some embodiments, an augmented reality simulation may be provided as interactive visual data overlaid on everything that may be viewed through the lens of a headset. As such, the interactive visual data may appear to be projected onto a number of things, including but not limited to, a steering wheel, an speedometer (e.g., presenting a speed at which the vehicle is moving during the simulation), a rear view mirror (e.g., projecting other cars driving behind the vehicle), and a display screen on a center console and/or dashboard (e.g., displaying a "rear view" of the vehicle that would be provided from a video feed captured by a camera as the vehicle appears to be reversing during the simulation).

By "interactive," it is meant that a user may continue to enter inputs into the system that may be received by the system and used to adjust the simulation accordingly. For instance, upon receiving an input by a user to press a brake pedal in the vehicle, the interactive visual data may represent the vehicle slowing down.

Figures 4A, 4B:
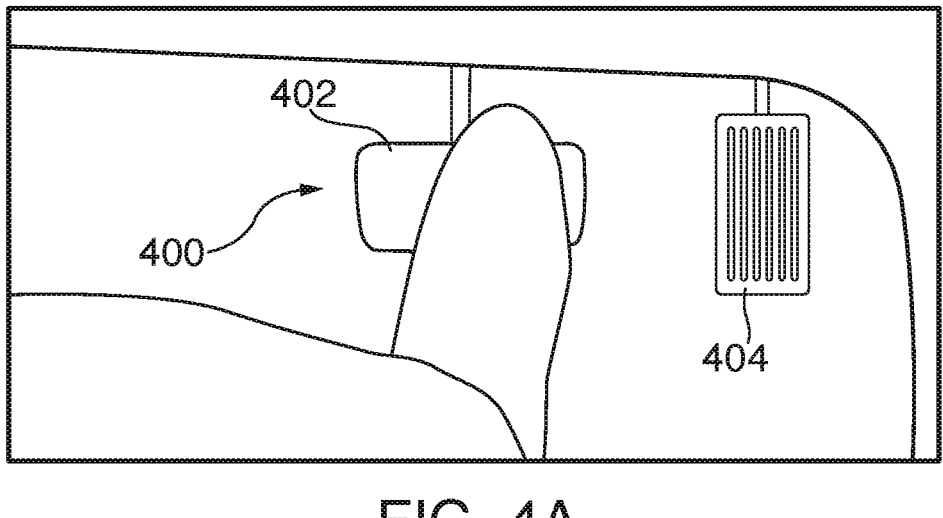
FIGS. 4A and 4B are an overhead view and a side view, respectively, of a system including a throttle pedal and a brake pedal that each include a way to detect pedal pressure, in accordance with various embodiments.

FIGS. 4A and 4B are an overhead view and a side view, respectively, of a system including a throttle pedal and a brake pedal that each include a vehicle control input device, in accordance with various embodiments. In various embodiments, system 400 includes brake pedal 402, throttle pedal 404, and device 406. A vehicle control input device may be, for example, an inertial measurement unit, a pressure sensor, an angular encoder, and/or any device or sensor capable of receiving inputs.

During a simulation, a user may merely sit in a vehicle as the vehicle appears to drive itself. However, at times, a user may choose to take control of a vehicle and cease automated functions. In the event that a user chooses to control the vehicle, it may be necessary for the vehicle to be capable of conveying that information such that the simulation is able to respond accordingly. Therefore, when the user presses his or her foot downward onto brake pedal 402, device 406 detects the downward movement being applied to brake pedal 402. Device 406 may include communications circuitry for communicating this movement to a headset, a user device, or a server, which may interpret the movement as a user input, and then adjust the simulation by reducing the apparent speed of the vehicle.

Figure 5A:
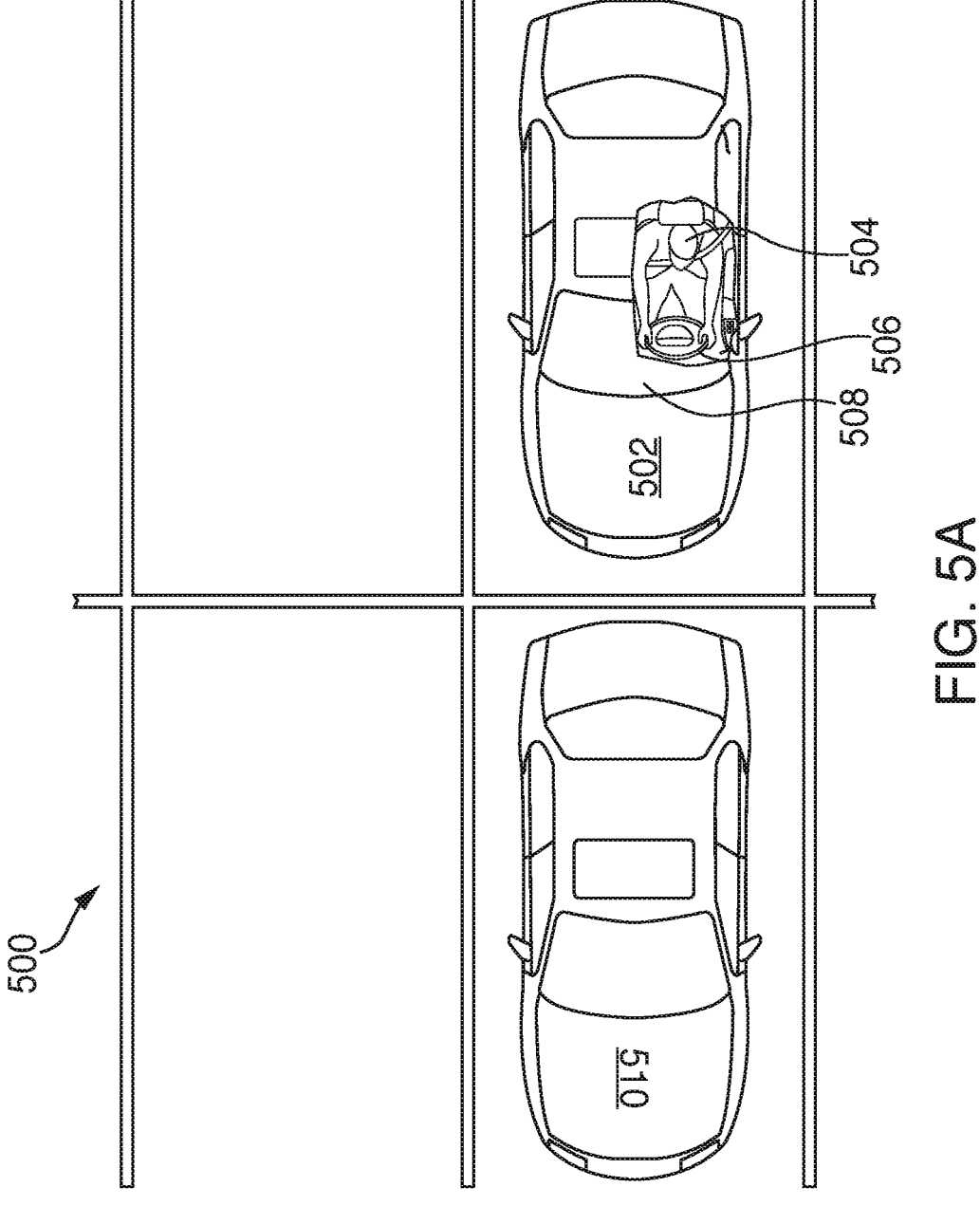
FIGS. 5A, 5B, and 5C are illustrations showing various views of a system for a driving simulation, in accordance with various embodiments.
Figure 5B:
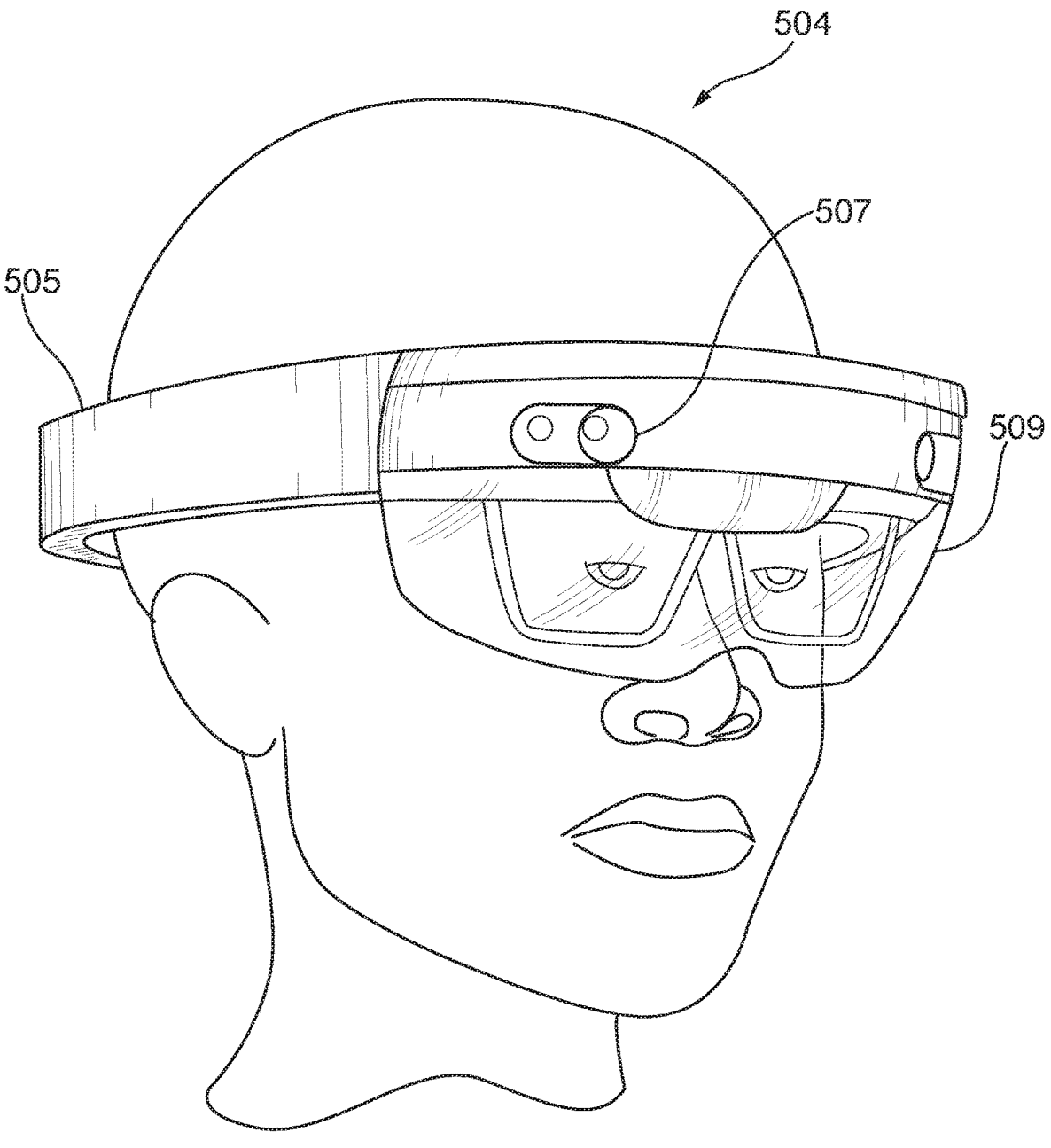
Figure 5C:
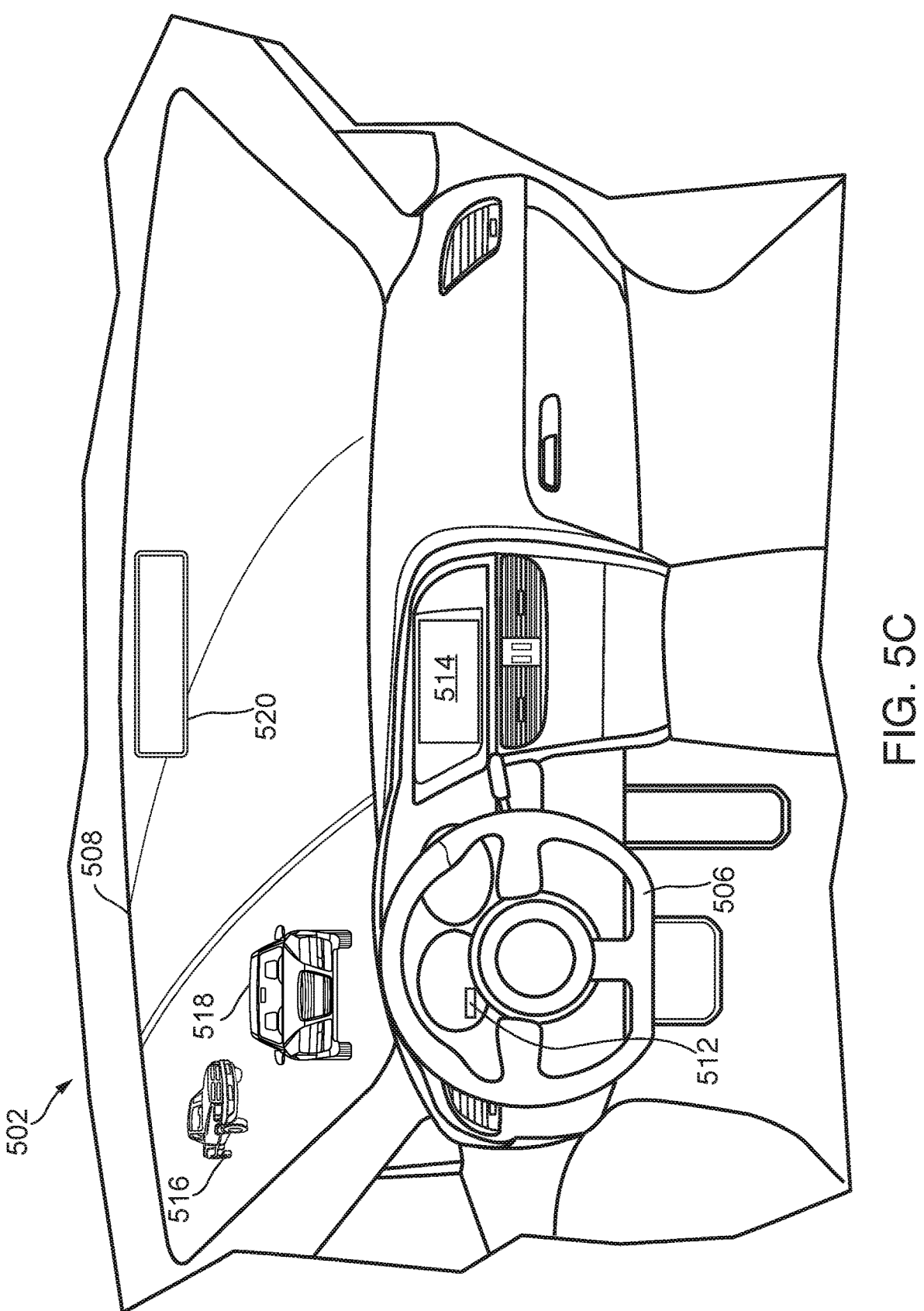

FIGS. 5A, 5B, and 5C are illustrations showing various views of a system for a semi-autonomous (SAE levels 2 to 5) automobile simulation, in accordance with various embodiments. FIG. 5A is an overhead view of an automobile within a system for a simulation, in accordance with various embodiments. As shown in FIG. 5A, an environment 500 (e.g., a parking lot) may include vehicle 502, which includes user 504, steering wheel 506, and windshield 508. Environment 500 may also include a second vehicle 510.

As is apparent in FIG. 5A, user 504 is sitting in vehicle 502. Vehicle 502 is parked in a parking lot, with vehicle 510 parked directly in front of vehicle 502. FIG. 5A presents a somewhat cross sectional view of vehicle 502 so that user 504 and steering wheel 506 are more visible. In an alternative embodiment, rather than an actual vehicle, vehicle 502 may be an artificial vehicle formed of a chair simulator that includes, but is not limited to, a seat, foot pedals, a rotating wheel, and a joystick.

FIG. 5B is an illustrative view of user 504 wearing a headset 505, in accordance with various embodiments. As shown in FIG. 5B, headset 505 includes a camera 507 and a lens 509. As user 504 sits in vehicle 502, user 504 may wear headset 505 in order to receive an augmented reality experience. Camera 507 may be used to capture images of the interior of vehicle 502, and may identify the make and model of vehicle 502 based on potential unique characteristics of the make and model of vehicle 502, such as, for instance, a quality of steering wheel 506, the shape of windshield 508, a quality of a speedometer, etc. Once this information is ascertained and the simulation begins, user 504 may receive interactive visual data through lens 509.

FIG. 5C is an interior view of vehicle 502, in accordance with various embodiments. More particularly, FIG. 5C is a view of vehicle 502 and the surrounding environment from the perspective of user 504 through headset 505. In various embodiments, vehicle 500 includes windshield 508 (through which oncoming traffic from vehicles 516 and 518 is visible), steering wheel 506, device 512, dashboard display 514, and rear view mirror 520. As stated with respect to FIG. 5B, vehicle 502 is merely parked in a parking lot. However, according to the perspective of user 504, vehicle 510, which is actually parked directly in front of vehicle 502, is nowhere to be seen. Instead, according to the perspective of user 504 through headset 505, user 504 is in a semi-autonomous (SAE levels 2 to 5) vehicle that is driving on a road, passing by oncoming traffic from vehicles 516 and 518. In some embodiments, headset 505 (or, alternatively, a server, a user device, or some other device that stores the simulation and can send instructions to vehicle 502) may send instructions to vehicle 502 to operate as though vehicle 502 were actually driving on the road produced by the simulation. Thus, in some embodiments, vehicle 502 may cause steering wheel to move as though vehicle 502 were actually steering vehicle 502 as vehicle 502 self-drives along the road. In some embodiments, user 504 may choose to take control of vehicle 502, and may grab steering wheel 506 and attempt to steer vehicle 502 by his or herself. Accordingly, these user inputs would be received as movement at device 512, transmitted to headset 505 (or, alternatively, a server, a user device, or some other device that stores and controls the simulation), which will ultimately cause headset 505 to adjust the output that it is providing to user 504 via lens 509, causing the simulation to react to the actions of user 504, which provides user 504 with an interactive, real-time experience in a semi-autonomous (e.g., SAE levels 2 to 5) vehicle. In some embodiments, vehicle 502 may be an actual vehicle, rather than a booth, chair simulator, or other artificial environment for emulating an actual vehicle. As such, vehicle 502 may include communications circuitry for receiving instructions to deactivate certain features so that actions made by user 504 do not actually occur in the real world. For instance, if vehicle 502 is turned on, and user 504 steps on a throttle pedal, changes gears, or otherwise interacts with various features of vehicle 502 while operating a simulation, those features may be momentarily deactivated on vehicle 502. In this way, actions taken by user 504 that are detected at vehicle control input devices may affect a simulation, without actually affecting vehicle 502.

Figure 6:
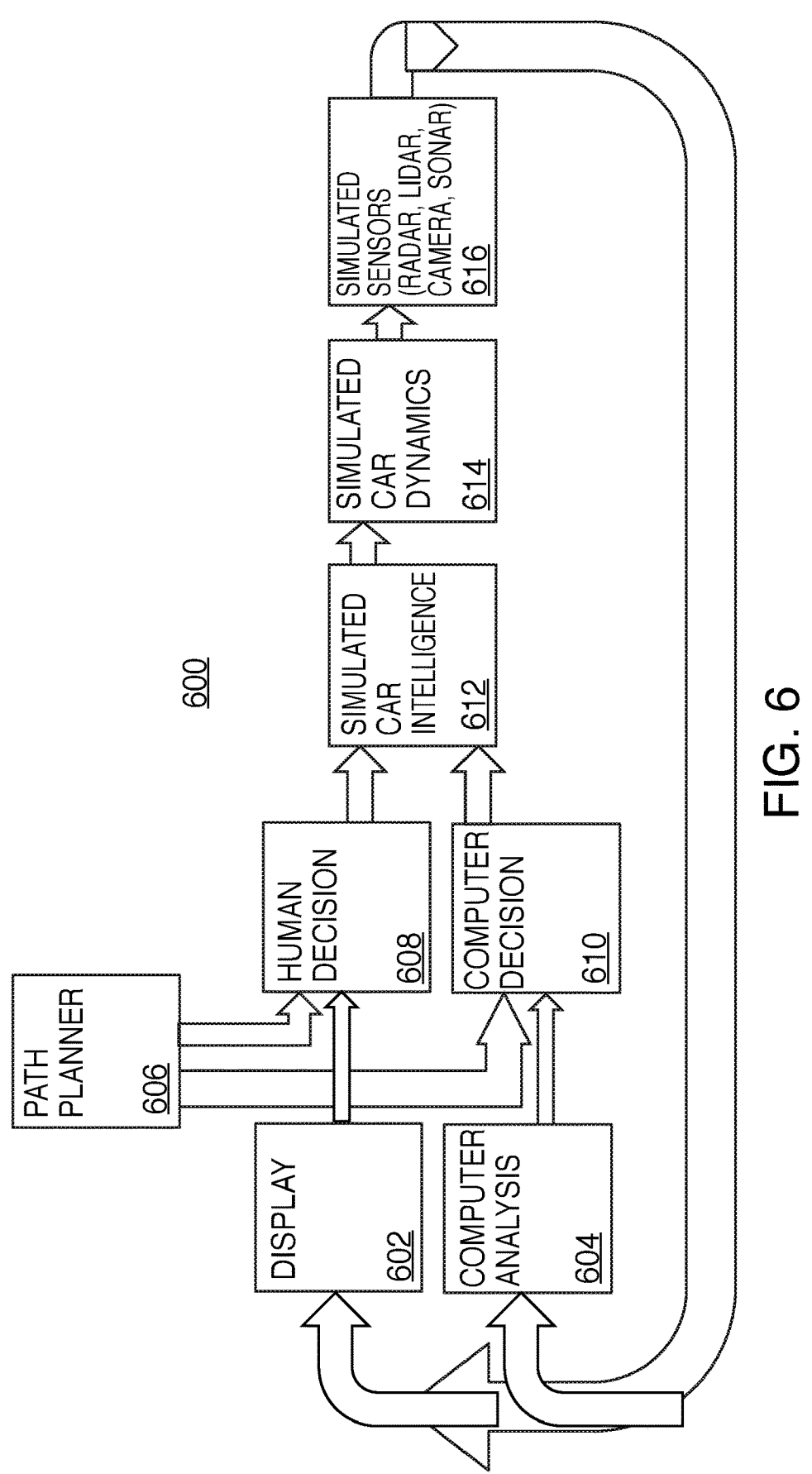
FIG. 6 is a schematic illustration of a system, in accordance with various embodiments.

FIG. 6 is a schematic illustration of a system, in accordance with various embodiments. In various embodiments, system 600 may include display 602, computer analysis 604, path planner 606, human decisions 608, computer decisions 610, simulated car intelligence 612, simulated car dynamics 614, and simulated sensors 616.

Each component of system 600 is taken into account as a simulation is displayed via interactive visual data on display 602. Specifically, computer analysis is performed by various processors to monitor all inputs as well as the instantaneous status of the virtual vehicle during the simulation. In various embodiments, interactive visual data may include a planned path through which a virtual vehicle is intended to navigate a simulation. As human decisions are made, as well as decisions made by a semi-autonomous vehicle (depending on the level or autonomy, such as levels 2 to 5 according to SAE) that may alter the planned path, causing a simulation to deviate from a predetermined route. Additional factors, such as the identified vehicle's simulated intelligence 612 and capabilities 614 may determine the manner in which interactive visual data may be displayed. Additional variables provided by simulated sensors 616, such as obstructions included into the simulated environment that may not necessarily be visible to the user, may be included in the simulation. All of these factors may be included in what is ultimately displayed to a user during a simulation.

In order to better understand the system disclosed in FIG. 6, the following illustrative example is provided. A user may begin a simulation. After identifying the vehicle that the user is operating (or, in the event of a chair simulator, the vehicle that the user would like to operate during the simulation), a simulation may begin based on a preset environment, such as a highway on during cloudy afternoon. Based on certain human decisions, such as a decision to accelerate, brake, or steer the virtual vehicle, as well as decisions made by the vehicle in accordance with certain automated features, the simulation might alter the path of the vehicle by, for instance, switching lanes on the highway, or exiting the highway altogether. Based on the identified vehicle's features (e.g., automatic braking, lane keeping, etc.) as well as a condition of the vehicle (the ability of the vehicle's tires to maintain traction with the road in the event of a sudden brake at the speed of the virtual vehicle during the simulation, etc.), and the various sensors that may be present and active on the identified vehicle (sensing adjacent vehicles, obstructions in the road that might cause an accident, etc.), the virtual vehicle might maneuver in particular manners during the simulation in order to account for the variety of variables determined within the simulation. All of this information will be displayed to the user via display 602. Each of these components of system 600 will continue to operate throughout the simulation in order to continuously adjust display 602 to reflect the situation determined during the simulation.

The above-described embodiments of the invention are presented for purposes of illustration and are not intended to be limiting. Although the subject matter has been described in language specific to structural features, it is also understood that the subject matter defined in the appended claims is not necessarily limited to the specific features described. Rather, the specific features are disclosed as illustrative forms of implementing the claims.

What is claimed is:

1. A method for providing an operator with an augmented reality continuous interactive driving experience, the method comprising:

providing a real automobile that is stationary, the real automobile having an internal vehicle simulation environment comprising one or more physical vehicle control inputs that are visible from a first person perspective of the operator located within the internal vehicle simulation environment, the one or more physical vehicle control inputs comprising a steering wheel that is mechanically and/or electronically decoupled from the real automobile's front and rear wheels such that rotation of the steering wheel does not have an effect on directional steering of the wheels on the real automobile, the internal vehicle simulation environment further comprising a front windshield and side windows on either side of the operator, the windshield and side windows each having a sensor coupled thereto;

displaying on a display screen, from the first person perspective of the operator located within the internal vehicle simulation environment, a live and dynamic augmented reality view of an external environment representative of a space outside the internal vehicle simulation environment, wherein a dynamic driving scene is visually presented as one or more virtual objects which are not actually physically present in the external environment, but which visually appear to be present to the operator through augmented reality, the display screen being provided in an augmented reality headset that the operator wears, the headset comprising a camera that detects each sensor and receives a transmission therefrom to project onto the display screen a visual appearance of the one or more virtual objects being present in the external environment through the windshield and windows to which each respective sensor is coupled, the display screen enabling the operator to have 360 degree visualization of the internal environment and external environment, the display screen providing a view to the operator of the one or more virtual objects in the external environment while enabling the operator to view real physical items within the internal environment, wherein the operator's rotating or tilting of his or her head in different directions causes the one or more virtual objects the operator sees to spatially adjust accordingly, thereby simulating an immersive driving scene for the operator; and continuously receiving signals from the operator's manual actuation of the one or more physical vehicle control inputs, the signals being operative to provide a visual appearance to the operator, through augmented reality, that the operator is driving in a vehicle past the one or more virtual objects, to visually depict to the operator an appearance of acceleration, deceleration, stopping and turning in response to corresponding signals received from the operator, thereby simulating an immersive and continuous operator-controlled driving experience.

2. The method of claim 1, wherein the one or more virtual objects include a road and a vehicle on the road and the real physical items include the operator's hands on the steering wheel.

3. The method of claim 1, wherein the operator's manual actuation of the one or more physical vehicle control inputs is performed in a manual mode, the method further including a semi-autonomous mode that simulates semi-autonomous driving by automatically generating automated signals to provide a visual appearance to the operator, through augmented reality, of the vehicle driving past the one or more virtual objects, without the operator's manual actuation of the one or more physical vehicle control inputs, the steering wheel being motorized and rotating on its own to generate a visual appearance of autonomous steering in the immersive driving scene presented on the display screen, wherein the method includes a step of switching from manual mode to semi-autonomous mode and a step of switching from semi-autonomous mode to manual mode.

4. The method of claim 1, wherein the internal vehicle simulation environment includes a rear-view mirror having a sensor also coupled thereto, the camera detecting the sensor coupled to the rear-view mirror and receiving a transmission therefrom to project onto the display screen a visual appearance of the one or more virtual objects in the external environment at a location behind the real automobile.

5. The method of claim 1, the internal vehicle simulation environment comprising a physical vehicle dashboard with a physical speedometer that visually indicates, through augmented reality, a speed at which the vehicle is simulated to be moving.

6. A system for providing an operator with an augmented reality continuous interactive driving experience, the system comprising:

a real automobile that is stationary, the real automobile having an internal vehicle simulation environment in which one or more vehicle control input devices are located, the internal vehicle simulation environment further comprising a front windshield and side windows on either side of a seat for the operator in the internal vehicle simulation environment, the windshield and side windows each having a sensor coupled thereto, the one or more physical vehicle control input devices including a steering wheel that is mechanically and/or electronically decoupled from the real automobile's front and rear wheels such that rotation of the steering wheel does not have an effect on directional steering of the wheels on the real automobile;

an augmented reality headset configured to be worn by the operator, the augmented reality headset comprising a display screen and a camera;

a processor; and communications circuitry configured to transmit input signals to the processor in response to actuation of the one or more physical vehicle control input devices, the communications circuitry being further configured to transmit display signals from the processor to the display screen;

wherein the processor is operable to:

continuously receive the input signals from the one or more physical vehicle control input devices, the input signals being generated in response to manual actuation of the one or more physical vehicle control input devices; and display, on the display screen, a first person live and dynamic augmented reality view of an external environment representative of a space outside the internal vehicle simulation environment, wherein a dynamic driving scene is visually presented on the display screen in the form of one or more virtual objects which are not actually physically present in the external environment, but which visually appear to be present, through augmented reality, from a first person perspective within the internal vehicle simulation environment, the camera being operable to detect each sensor and receive a transmission therefrom to project onto the display screen a visual appearance of the virtual objects being present in the external environment through the windshield and windows to which each respective sensor is coupled, wherein the input signals are operative to cause the processor to transmit the display signals that provide, on the display screen, a visual appearance from the first person perspective within the internal vehicle simulation environment that the operator is driving in a vehicle past the one or more virtual objects to convey to the operator an appearance that he or she is accelerating, decelerating, stopping and turning, to thereby simulate an immersive and continuous operator-controlled driving experience, the display screen enabling the operator to have 360 degree visualization of the internal environment and external environment, the augmented reality headset being configured to cause the one or more virtual objects to spatially adjust on the display screen in response to the operator rotating or tilting his or her head in different directions, thereby simulating an immersive driving scene for the operator, the display screen providing a view of the one or more virtual objects in the external environment while enabling the operator to view real physical items within the internal environment.

7. The system of claim 6, wherein the input signals are generated in a manual mode, the system further being operable in a semi-autonomous mode that simulates semi-autonomous driving by automatically generating automated signals to provide a visual appearance from the first person perspective within the internal vehicle simulation environment, through augmented reality, of the vehicle driving past the one or more virtual objects, without manual actuation of the one or more physical vehicle control inputs, the steering wheel being motorized and configured to rotate on its own to generate a visual appearance of autonomous steering in the immersive driving scene presented on the display screen, the system being configured to switch from manual mode to semi-autonomous mode and back.

8. The system of claim 6, the one or more physical vehicle control input devices comprising, in addition to the steering wheel, a throttle pedal and a brake pedal, each of which has coupled thereto one or more inertial measurement unit sensors for detecting operator actuation and transmitting the resulting input signals to the processor.

9. The system of claim 6, further comprising a speaker operative to generate sounds indicative of driving.

10. The system of claim 6, further comprising an On-Board Diagnostic port to which the augmented reality headset is operatively coupled.

11. The method of claim 1, wherein each sensor comprises a green screen that covers the windshield and each side window.

12. The method of claim 1, wherein each sensor is a sticker or tag comprising machine readable indicia configured to convey through the camera the location, geometry and orientation of each surface to which the sticker or tag is coupled and emits the transmission.

13. The method of claim 12, wherein the machine readable indicia is in the form of a QR code.

14. The system of claim 6, wherein each sensor comprises a green screen that covers the windshield and each side window.

15. The system of claim 6, wherein each sensor is a sticker or tag comprising machine readable indicia configured to convey through the camera the location of each surface to which the sticker or tag is coupled and emits the transmission.

16. The system of claim 15, wherein the machine readable indicia is in the form of a QR code.

17. A method for providing an operator with an augmented reality continuous interactive driving experience, the method comprising:

providing a real automobile that is stationary, the real automobile having an internal vehicle simulation environment comprising one or more physical vehicle control inputs that are visible from a first person perspective of the operator located within the internal vehicle simulation environment, the one or more physical vehicle control inputs comprising a steering wheel that is mechanically and/or electronically decoupled from the real automobile's front and rear wheels such that rotation of the steering wheel does not have an effect on directional steering of the wheels on the real automobile, the internal vehicle simulation environment further comprising a front windshield and side windows on either side of the operator, the windshield and side windows each having a sticker or tag coupled thereto;

displaying on a display screen, from the first person perspective of the operator located within the internal vehicle simulation environment, a live and dynamic augmented reality view of an external environment representative of a space outside the internal vehicle simulation environment, wherein a dynamic driving scene is visually presented as one or more virtual objects which are not actually physically present in the external environment, but which visually appear to be present to the operator through augmented reality, the display screen being provided in an augmented reality headset that the operator wears, the headset comprising a depth sensor configured to sense the three-dimensional geometry of the automobile and synchronize machine learning software to work in conjunction with the sticker or tag coupled to the windshield and each window and, through associated three dimensional object recognition software, causing a processor to determine geometry, orientation and location of the windshield and windows, thereby enabling projection onto the display screen a visual appearance of the virtual objects being present in the external environment through the windshield and windows to which each respective sticker or tag is coupled, the display screen enabling the operator to have 360 degree visualization of the internal environment and external environment, the display screen providing a view to the operator of the one or more virtual objects in the external environment while enabling the operator to view real physical items within the internal environment, wherein the operator's rotating or tilting of his or her head in different directions causes the one or more virtual objects the operator sees to spatially adjust accordingly, thereby simulating an immersive and interactive driving scene for the operator; and continuously receiving signals from the operator's manual actuation of the one or more physical vehicle control inputs, the signals being operative to provide a visual appearance to the operator, through augmented reality, that the operator is driving in a vehicle past the one or more virtual objects to visually depict to the operator an appearance of acceleration, deceleration, stopping and turning in response to corresponding signals received from the operator, thereby simulating an immersive and continuous operator-controlled driving experience.

18. The method of claim 17, wherein the depth sensor is an infrared emitter/transmitter.

* * * * *